United States Patent
Chen et al.

(10) Patent No.: US 9,564,809 B2
(45) Date of Patent: Feb. 7, 2017

(54) ZERO CURRENT DETECTING CIRCUIT AND METHOD AND RELATED SYNCHRONOUS SWITCHING POWER CONVERTER

(71) Applicant: Anpec Electronics Corporation, Hsin-Chu (TW)

(72) Inventors: Chih-Yuan Chen, Hsinchu (TW); Tzu-Yang Yen, Taipei (TW)

(73) Assignee: Anpec Electronics Corporation, Hsin-Chu (TW)

( * ) Notice: Subject to any disclaimer, the term of this patent is extended or adjusted under 35 U.S.C. 154(b) by 3 days.

(21) Appl. No.: 14/842,813

(22) Filed: Sep. 1, 2015

(65) Prior Publication Data

US 2016/0308441 A1    Oct. 20, 2016

(30) Foreign Application Priority Data

Apr. 16, 2015    (TW) ............................. 104112268 A

(51) Int. Cl.
*H02M 5/293*        (2006.01)
*H02M 3/158*        (2006.01)

(52) U.S. Cl.
CPC .................................. *H02M 3/158* (2013.01)

(58) Field of Classification Search
CPC ............... H02M 3/156–3/158; H02M 3/1584; H02M 3/1588; H02M 2001/007; H02M 2001/009; H02M 2001/0032; H02M 2001/0045; G05F 1/45; G05F 1/445; G05F 1/452
USPC ........ 323/223, 224, 235, 239, 240, 282–284
See application file for complete search history.

(56) References Cited

U.S. PATENT DOCUMENTS

| | | | |
|---|---|---|---|
| 6,906,500 B2 | 6/2005 | Kernahan | |
| 7,030,596 B1 | 4/2006 | Salerno | |
| 7,072,198 B2 | 7/2006 | Krug | |
| 7,154,250 B2 | 12/2006 | Vinciarelli | |
| 7,279,877 B1 | 10/2007 | Tseng | |
| 7,309,977 B2 | 12/2007 | Gray | |
| 7,321,222 B2* | 1/2008 | Hojo | H02M 3/156 323/224 |
| 7,977,926 B2* | 7/2011 | Williams | H02M 3/158 323/223 |

(Continued)

FOREIGN PATENT DOCUMENTS

| | | |
|---|---|---|
| TW | 201230681 A1 | 7/2012 |
| TW | 201240341 A1 | 10/2012 |

*Primary Examiner* — Yemane Mehari
(74) *Attorney, Agent, or Firm* — Winston Hsu; Scott Margo

(57) ABSTRACT

A zero current detecting circuit is disclosed. The zero current detecting circuit includes a first zero current comparator for determining current variation on an inductor of a synchronous switching power converter so as to output a zero current signal to turn off a down-bridge transistor of the synchronous power converter; a second zero current comparator for determining whether the first zero current comparator turns off the down-bridge transistor too early or too late and outputting a comparison result; a counter coupled to the second zero current comparator for ascending or descending a control bit according to the comparison result, and an adjustable delay unit coupled to the first zero current comparator and the counter for adjusting a delay time according to the control bit, and delaying and outputting the zero current signal according to the delay time, to compensate a negative offset voltage by delay.

13 Claims, 6 Drawing Sheets

(56) References Cited

U.S. PATENT DOCUMENTS

| | | |
|---|---|---|
| 8,278,889 B2 | 10/2012 | Tateishi |
| 8,441,238 B2 * | 5/2013 | Chen .................. H02M 3/1588 |
| | | 323/222 |
| 2008/0030178 A1 | 2/2008 | Leonard |
| 2008/0211473 A1 | 9/2008 | Tlasksl |
| 2008/0298106 A1 | 12/2008 | Tateishi |
| 2010/0052629 A1 | 3/2010 | Chu |
| 2012/0119715 A1 | 5/2012 | Loikkanen |

* cited by examiner

ZERO CURRENT DETECTING CIRCUIT AND METHOD AND RELATED SYNCHRONOUS SWITCHING POWER CONVERTER

BACKGROUND OF THE INVENTION

1. Field of the Invention

The present invention relates to a zero current detecting circuit and method and related synchronous switching power converter, and more particularly, to a zero current detecting circuit and method and related synchronous switching power converter for improving power converting efficiency.

2. Description of the Prior Art

A switching power converter is an electronic device performing power conversion through switching switches, and is widely used in electronic products with a power supply. For a synchronous switching power converter based on inductors, when the load is light, the converting efficiency can be increased through a discontinuous mode. For example, FIG. 1 is a schematic diagram of a synchronous switching power converter 10. The power converter 10 operates in the discontinuous mode, so that the current on the inductor 104 will not be negative. When the up-bridge transistor 101 is turned on, the inductor 104 is charged. When the down-bridge transistor 102 is turned on, the inductor 104 is discharged, so that the current on the inductor 104 is gradually decreased down to zero. When the current on the inductor 104 is decreased to zero, the down-bridge transistor 102 has to be turned off immediately, so that the current on the inductor 104 will not be negative.

If the down-bridge transistor 102 is not turned off accurately at the moment of the current on the inductor 104 being zero, the converting efficiency of the power converter 10 in the discontinuous mode will be decreased. For example, if the down-bridge transistor 102 is turned off before the moment of the current on the inductor 104 being decreased to be zero, the body diode of the down-bridge transistor 102 will be turned on, which causes the conduction loss and the converting efficiency is decreased. Oppositely, if the down-bridge transistor 102 is turned off after the moment of the current on the inductor 104 being decreased to be zero, the voltage at the node SW will be suddenly increased, which causes switching loss at the down-bridge transistor 102, and the converting efficiency is decreased as well.

Therefore, it is very important to turn off the down-bridge transistor 102 accurately so that the current on the inductor 104 can be decreased to be zero without being negative for the power converter design. In the prior art, the voltage across the resistor RS is measured to determine if the current on the inductor 104 is decreased to be zero. When a comparator 106 of a control circuit 108 measures the voltage on the resistor RS is zero, the output of the comparator 106 changes its state, and thus the control circuit 108 outputs a signal to turn off the down-bridge transistor 102.

Ideally, when the current on the inductor 104 is decreased to be zero, the down-bridge transistor 102 should be turned off to limit the conduction and switching loss of the power converter 100. However, in practice, an offset voltage exists in the comparator 106, and therefore the moment of the voltage on the resistor RS being zero cannot be accurately determined. Consequently, the down-bridge transistor 102 cannot be turned off accurately at the moment of the current on the inductor 104 being zero, and the conduction and switching loss of the power converter 10 cannot be effectively reduced.

SUMMARY OF THE INVENTION

It is therefore an object to provide a zero current detecting circuit and method and related synchronous switching power converter for detecting accurately at the moment of the current on an inductor being zero.

The present invention discloses a zero current detecting circuit. The zero current detecting circuit comprises a first zero current comparator for determining current variation on an inductor of a synchronous switching power converter so as to output a zero current signal to turnoff a down-bridge transistor of the synchronous switching power converter; a second zero current comparator for determining whether the first zero current comparator turns off the down-bridge transistor too early or too late, and outputting a comparison result; a counter coupled to the second zero current comparator for ascending or descending a control bit according to the comparison result; and an adjustable delay unit coupled to the first zero current comparator and the counter for adjusting a delay time according to the control bit, and delaying and outputting the zero current signal according to the delay time, to compensate a negative offset voltage by delay.

The present invention further discloses a synchronous switching power converter with zero current detecting. The synchronous switching power converter comprises an up-bridge transistor comprising a first terminal coupled to an input power supply; a second terminal; and a third terminal for receiving a turned-on signal; a down-bridge transistor comprising a first terminal coupled to a ground; a second terminal coupled to the second terminal of the up-bridge transistor; and a third terminal for receiving a turned-off signal; an inductor coupled between the second terminal of the down-bridge transistor and an output capacitor; and a zero current detecting circuit comprising a first zero current comparator for determining current variation on the inductor of a synchronous switching power converter so as to output a zero current signal to turn off a down-bridge transistor of the synchronous switching power converter; a second zero current comparator for determining whether the first zero current comparator turns off the down-bridge transistor too early or too late and outputting a comparison result; a counter coupled to the second zero current comparator for ascending or descending a control bit according to the comparison result; and an adjustable delay unit coupled to the first zero current comparator and the counter for adjusting an delay time according to the control bit, and delaying and outputting the zero current signal according to the delay time, to compensate a negative offset voltage by delay.

The present invention further discloses a zero current detecting method for a synchronous switching power converter. The zero current detecting method comprises determining current variation on an inductor of a synchronous switching power converter to output a zero current signal to turn off a down-bridge transistor of the synchronous switching power converter; determining whether the down-bridge transistor is turned off too early or too late and outputting a comparison result; ascending or descending a control bit according to the comparison result; and adjusting a delay time according to the control bit, and delaying and outputting the zero current signal according to the delay time, to compensate a negative offset voltage by delay.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
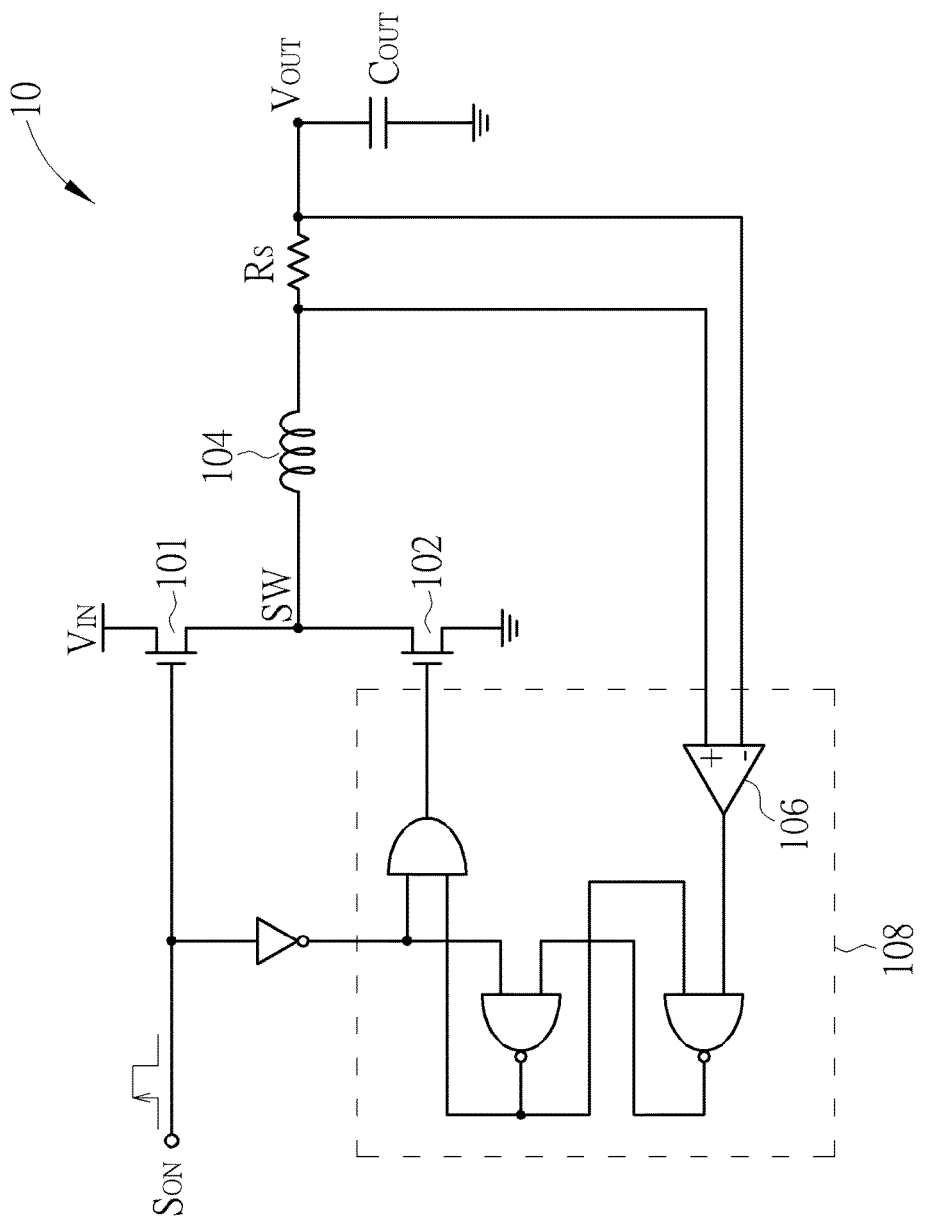
FIG. 1 is a schematic diagram of a synchronous switching power converter.
Figure 2:
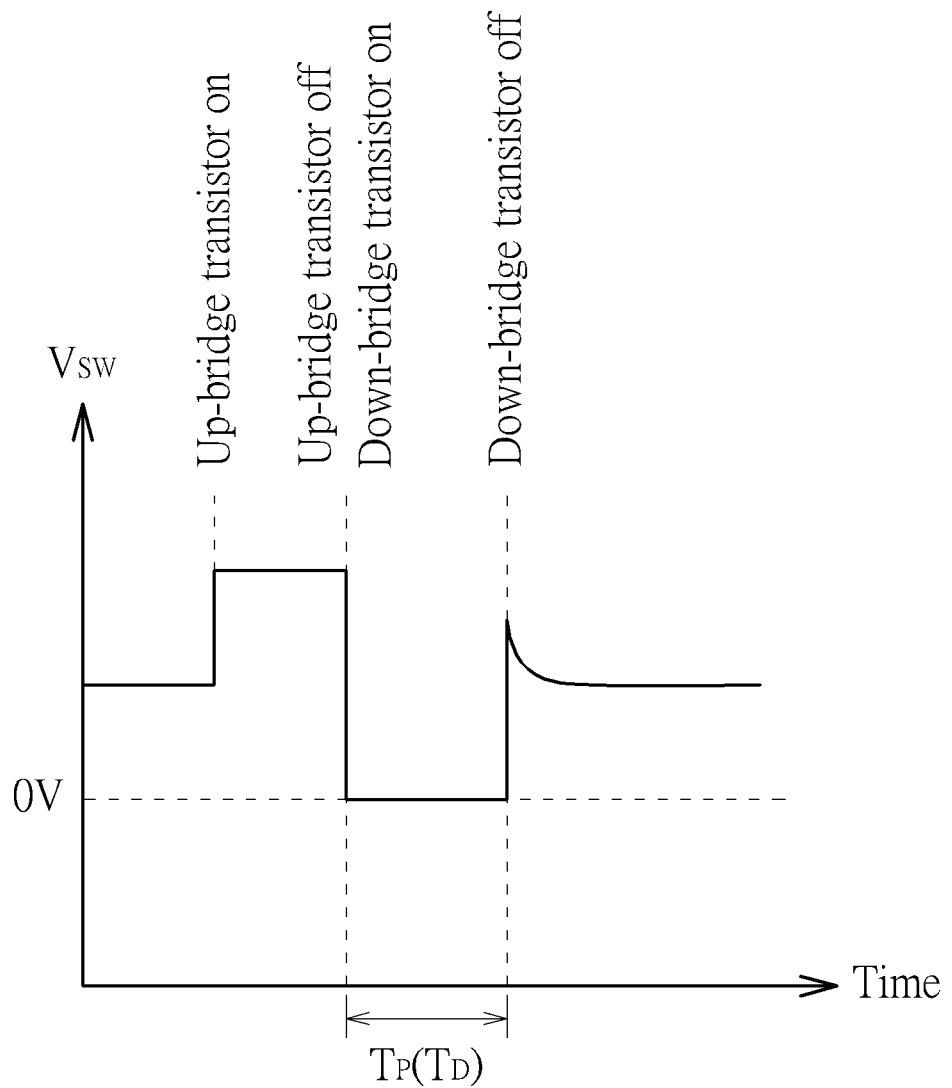
FIG. 2 is a timing diagram illustrating the down-bridge transistor in FIG. 1 being turned off before the moment of the current on the inductor in FIG. 1 being zero.
Figure 3:
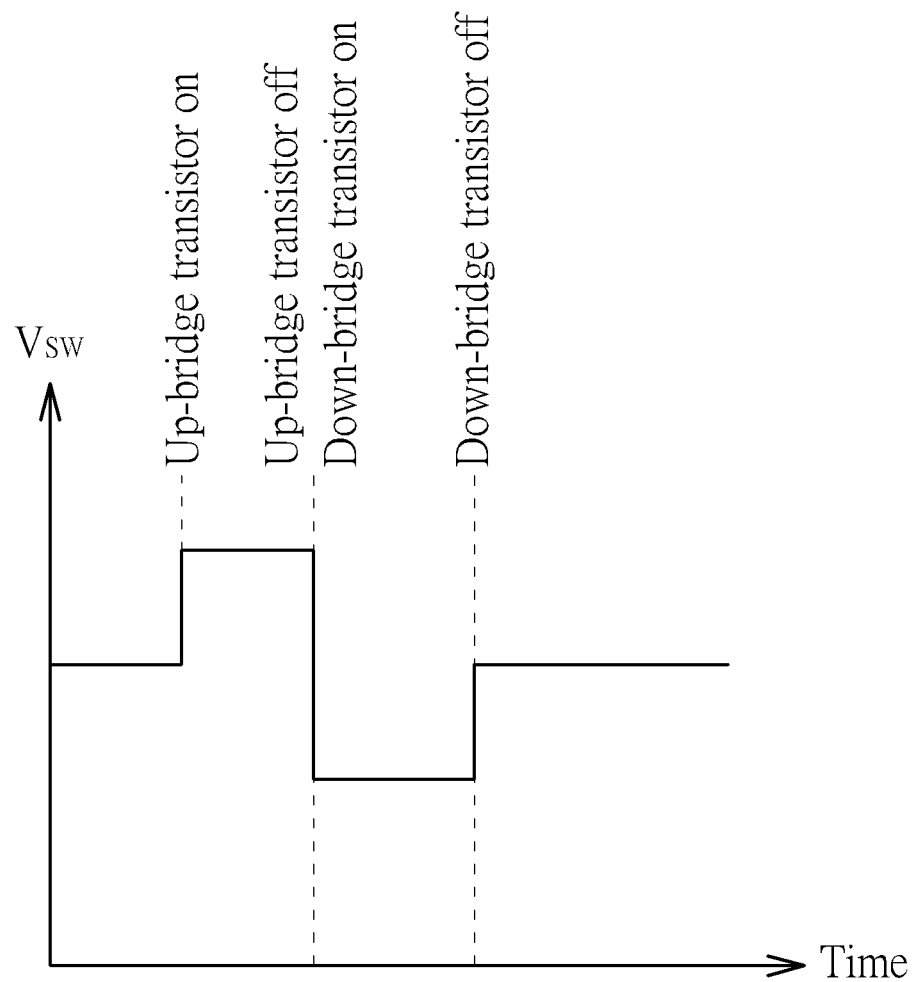
FIG. 3 is a timing diagram illustrating the down-bridge transistor in FIG. 1 being turned off accurately at the moment of the current on the inductor in FIG. 1 being zero.
Figure 4:
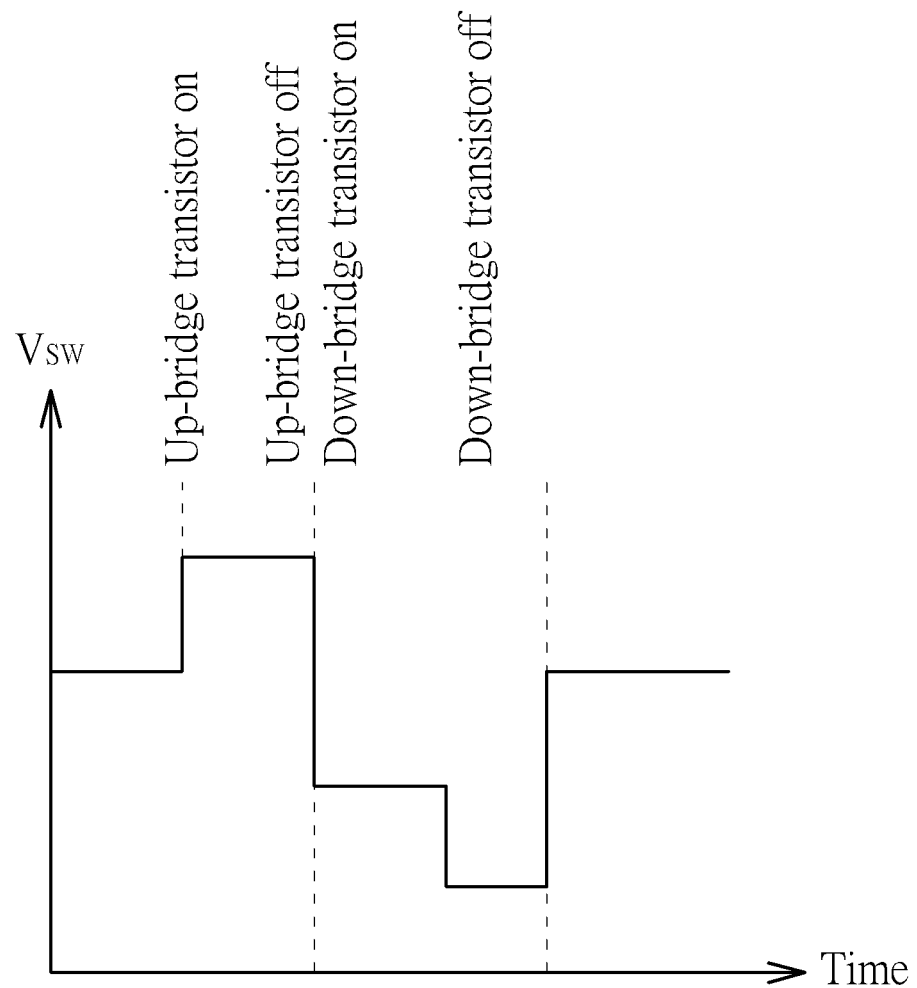
FIG. 4 is a timing diagram illustrating the down-bridge transistor in FIG. 1 being turned off after the moment of the current on the inductor in FIG. 1 being zero.

Please refer to FIG. 2, FIG. 3, and FIG. 4, which are diagrams illustrating relations between the moments of the down-bridge transistor 102 being turned off and the voltage $V_{SW}$. FIG. 2 is a timing diagram illustrating the down-bridge transistor 102 being turned off before the moment of the current on the inductor 104 being zero. FIG. 3 is a timing diagram illustrating the down-bridge transistor 102 being turned off accurately at the moment of the current on the inductor 104 being zero. FIG. 4 is a timing diagram illustrating the down-bridge transistor 102 being turned off after the moment of the current on the inductor 104 being zero. As shown in FIG. 2, if the down-bridge transistor 102 is turned off too early, which means the current on the inductor 104 has not been decreased to zero, the current on the inductor 104 flows to the input power source through the body diode of the transistor 102, and the voltage $V_{SW}$ at the node SW (hereinafter, inductor voltage $V_{SW}$) will be suddenly increased ($V_{SW}=V_{IN}+V_D$, where $V_D$ is the forward voltage of the body diode of the up-bridge transistor 101, e.g. 0.7 volt). As shown in FIG. 3, if the down-bridge transistor 102 is turned off accurately at the moment of the current on the inductor 104 being zero, the inductor voltage $V_{SW}$ will be zero as well. As shown in FIG. 4, if the down-bridge transistor 102 is turned off too late, which means the current on the inductor 104 has become negative, the current on the inductor 104 flows to the ground through the body diode of the transistor 102, and the inductor voltage $V_{SW}$ will be decreased to $-V_D$, e.g. -0.7 volt. Therefore, from FIG. 2, FIG. 3, and FIG. 4, it can be seen that the moment of turning off the down-bridge transistor 102 can be determined to be too early or too late according to the inductor 104 voltage $V_{SW}$. Simply speaking, the moment of turning off the down-bridge transistor 102 has to be within the duration that the inductor voltage $V_{SW}$ is zero, and thus the converting efficiency of the power converter will not degrade.

Figure 5:
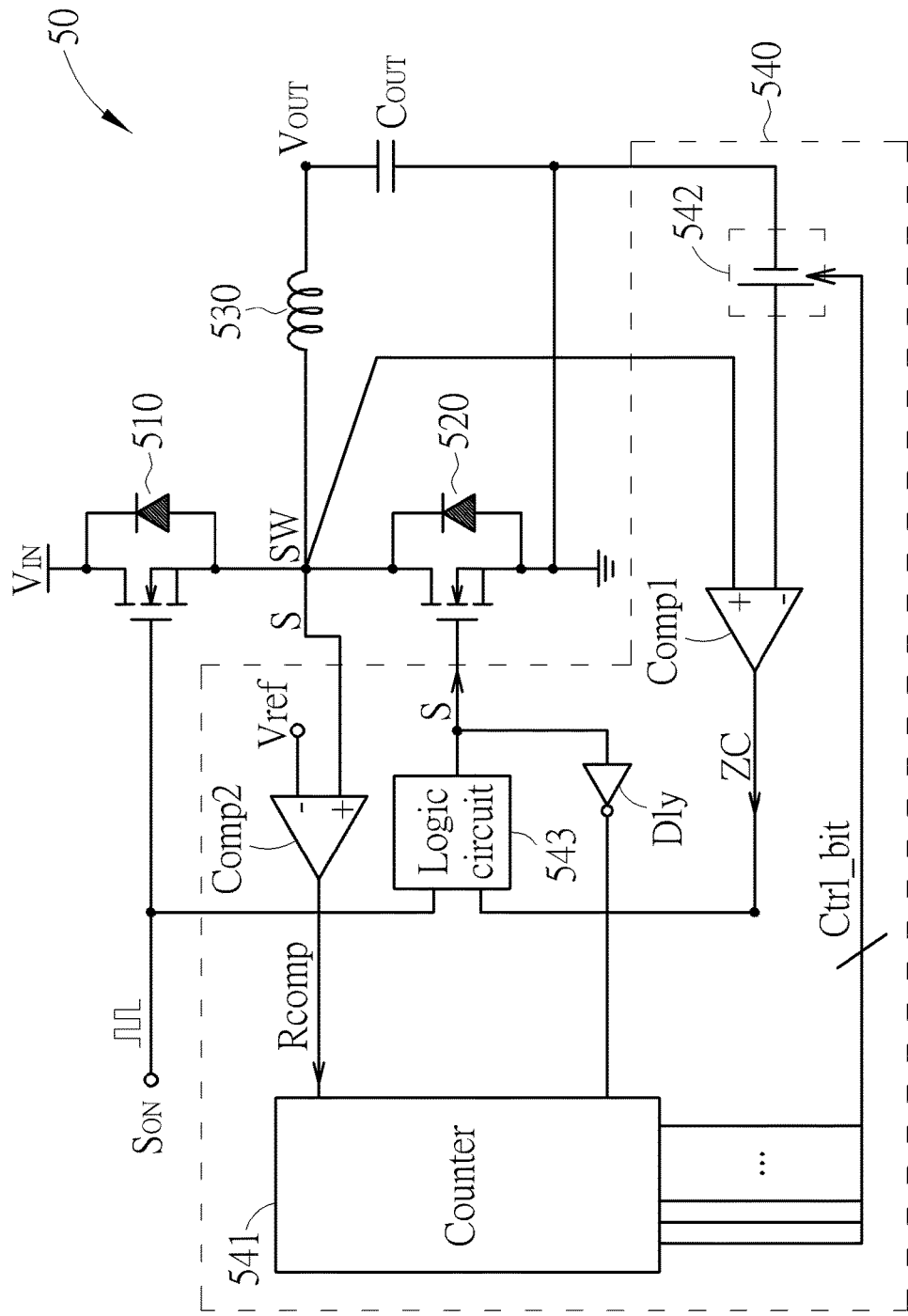
FIG. 5 is a schematic diagram illustrating a synchronous switching power converter of the present invention.

Please refer to FIG. 5, which is a schematic diagram of a synchronous switching power converter 50 of the present invention. The power converter 50 includes an up-bridge transistor 510, a down-bridge transistor 520, an inductor 530, an output capacitor $C_{OUT}$, and a zero current detecting circuit 540. It is preferable to use Metal-Oxide-Semiconductor Field-Effect Transistors (MOSFET) as the up-bridge transistor 510 and the down-bridge transistor 520. The up-bridge transistor 510 has a drain coupled to an input voltage $V_{IN}$, a gate for receiving a turned on signal $S_{ON}$, and a source coupled to a node SW. The down-bridge transistor 520 has a drain coupled to the node SW, a source coupled to ground, and a gate for receiving a turned off signal S. The inductor 530 is coupled to the node SW and an output capacitor $C_{OUT}$ and is used for outputting a voltage source VOUT. The zero current detecting circuit 540 includes a zero current comparator Cmp1, a zero current comparator Cmp2, a counter 541 and an adjustable voltage source 542. The zero current comparator Cmp1 determines the current variation on the inductor 530 to turn off the down-bridge transistor 520. A positive input terminal of the zero current comparator Cmp1 is coupled to the node SW for detecting the current variation on the inductor 530, and a negative input terminal of the zero current comparator Cmp1 is coupled to the adjustable voltage source 542 and an output terminal for outputting a zero current signal ZC to turn off the down-bridge transistor 520. The zero current comparator Cmp2 determines whether the zero current comparator Cmp1 turns off the down-bridge transistor 520 too early or too late, and outputs a comparison result $R_{comp}$. In detail, the positive input terminal of the zero current comparator Cmp2 is coupled to the node SW for detecting the current variation on the inductor 530. And the negative input terminal of the zero current comparator Cmp2 is coupled to a reference voltage $V_{ref}$. The output terminal of the zero current comparator Cmp2 is coupled to the counter 541 for outputting the comparison result $R_{comp}$ to the counter 541 according to the reference voltage $V_{ref}$ and the current variation on the inductor 530. The counter 541 is coupled to the zero current comparator Cmp2 for ascending or descending a control bit Ctrl_bit according to the comparison result $R_{comp}$. The adjustable voltage source 542 is coupled to the zero current comparator Cmp1 and the counter 541 for adjusting an offset voltage $V_{offset}$ according to the control bit Ctrl_bit.

In short, the zero current detecting circuit of the present invention utilizes the zero current comparator Cmp1 to execute zero current determination, so as to accordingly turn off the down-bridge transistor 520. And then, through the zero current comparator Cmp2 the present invention determines whether the zero current comparator Cmp1 turns off the down-bridge transistor 520 too early or too late and adjusts a comparison level of the zero current comparator Cmp1, so as to eliminate the offset voltage of the zero current comparator Cmp1, which allows the zero current comparator Cmp1 determines the moment of the current on the inductor 530 being zero accurately to control the down-bridge transistor 520 being turned off, and therefore the efficiency of the power converter 50 can be increased.

In addition, the zero current detecting circuit 540 further includes a delay unit Dly and a logic circuit 543. The delay unit Dly is coupled to the output terminal of the logic circuit 543 and the clock input of the counter 541 for controlling the sequence of the counter 541 counting upward or downward. The logic circuit 543 is coupled to the output terminal of the zero current comparator Cmp1 and is used for executing a logic computation to generate the turned off signal S according to the turned on signal $S_{ON}$ and the zero current signal ZC. Preferably, the logic circuit 543 can be a NOR gate. Therefore, detailed operating principle of the zero current detecting circuit can be described as follow.

The up-bridge transistor 510 receives the turned on signal $S_{ON}$ to control the connection between the input voltage $V_{IN}$ and node SW. The down-bridge transistor 520 controls the connection between the node SW and the ground according to the signal outputted by the zero current detecting circuit 540. When the zero current comparator Cmp1 detects the current on the inductor 530 being zero, the zero current detecting circuit 540 outputs zero current signal ZC and turns off the down-bridge transistor 520 by the logic circuit 543. In other words, when the voltage on the positive input terminal of the zero current comparator Cmp1 is lower than that on the negative input terminal, the zero current comparator Cmp1 outputs the zero current signal ZC at a low voltage level, and turns off the down-bridge transistor 520 by the logic circuit 543. After the down-bridge transistor 520 has turned off, the zero current comparator Comp2 compares the voltage $V_{SW}$ of the node SW with the reference voltage $V_{ref}$, so as to determine whether the zero current comparator Cmp1 turns off the down-bridge transistor 520 too early or too late, and further outputs the comparison result $R_{comp}$ to adjust the offset voltage $V_{offset}$. Preferably, the reference voltage $V_{ref}$ can be set to be zero. If the voltage $V_{SW}$ of the node SW is lower than the reference voltage $V_{ref}$, the zero current comparator Comp2 determines the down-bridge transistor 520 being turned off too late, and outputs the comparison result $R_{comp}$ at a low voltage level to the counter 541. The counter 541 counts upward after received the comparison result $R_{comp}$ at a low voltage level, so as to ascend the output control bit Ctrl_bit. In this situation, the adjustable voltage source 542 increases the offset voltage $V_{offset}$ according to the control bit Ctrl_bit. Oppositely, if the voltage $V_{SW}$ of the node SW is higher than the reference voltage $V_{ref}$, the zero current comparator Comp2 determines the down-bridge transistor 520 being turned off too early, and outputs the comparison result $R_{comp}$ at a high voltage level to the counter 541. After the comparison result $R_{comp}$ at a high voltage level is received the counter 541 counts downward, which descends the output control bit Ctrl_bit. In such situation, the adjustable voltage source 542 decreases the offset voltage $V_{offset}$ according to the control bit Ctrl_bit. As a result, the zero current comparator Cmp1 determines the moment of the current on the inductor 530 being zero accurately to control the down-bridge transistor 520 being turned off, so that the efficiency of the converter 50 can be increased.

Please note that the connection of the positive/negative input terminal of the zero current comparator Cmp1 and the zero current comparator Comp2 can be swapped, not limited herein. For example, the positive input terminal of the zero current comparator Comp2 can be coupled to the reference voltage $V_{ref}$, while the negative input terminal of the zero current comparator Comp2 can be coupled to the node SW. In this situation, if the zero current comparator Comp2 outputs the comparison result $R_{comp}$ at a low voltage level to the counter 541, the counter 541 counts downward to descend the output control bit Ctrl_bit after the comparison result $R_{comp}$ at a voltage level is received. The adjustable voltage source 542 decreases the offset voltage $V_{offset}$ according to the control bit Ctrl_bit. On the contrary, if the zero current comparator Comp2 outputs the comparison result $R_{comp}$ at a high voltage level to the counter 541, the counter 541 counts upward to ascend the output control bit Ctrl_bit after the comparison result $R_{comp}$ at a high voltage level is received. The adjustable voltage source 542 increases the offset voltage $V_{offset}$ according to the control bit Ctrl_bit.

Figure 6:
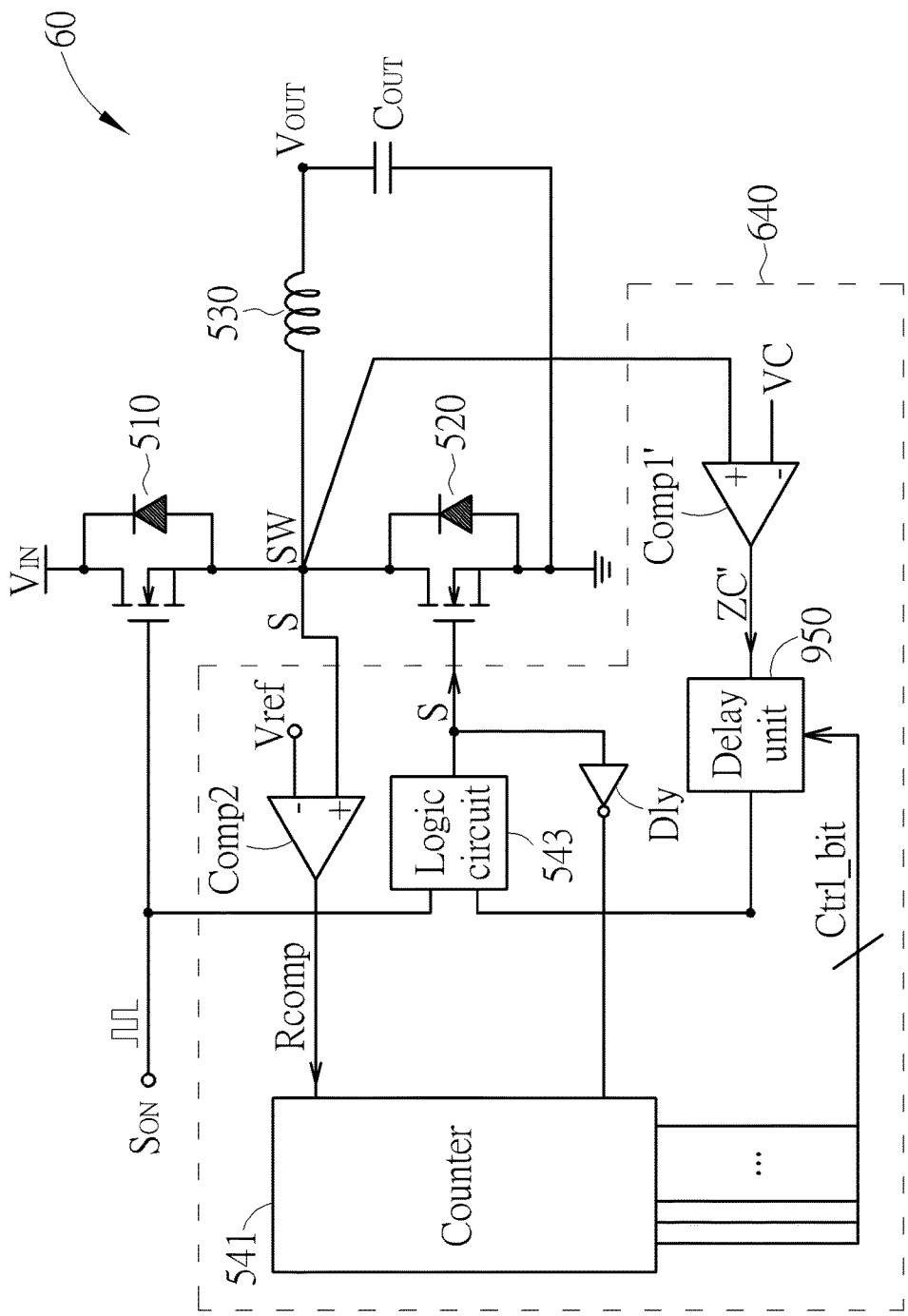
FIG. 6 is a schematic diagram illustrating another synchronous switching power converter of the present invention.

Moreover, please refer to FIG. 6, which is a schematic diagram of a synchronous switching power converter 60 according to an embodiment of the present invention. The power converter 60 is similar to the power converter 50, and elements with similar functions are denoted by the same notations. A main difference between the power converter 60 and the power converter 50 is that a zero current detecting circuit 640 of the power converter 60 includes a zero current comparator Cmp1' and an adjustable delay unit 950, but does not include an adjustable voltage source 542. The zero current comparator Cmp1' receives and compares a negative offset voltage VC to output a zero current signal ZC'. The adjustable delay unit 950 adjusts a delay time according to the control bit Ctrl_bit, and delays and outputs the zero current signal ZC' according to the delay time, to turn off the down-bridge transistor 520. The negative offset voltage VC is designed to early turn off the down-bridge transistor 520 if the zero current signal ZC' of the zero current comparator Cmp1' is directly used, and require the adjustable delay unit 950 to compensate, by delay, the portion of early turning off the down-bridge transistor 520 caused by the negative offset voltage VC of the zero current comparator Cmp1'.

In detail, the zero current detecting circuit of the present invention uses the zero current comparator Cmp1' to perform zero-current determination, and uses the adjustable delay unit 950 to delay the zero current signal ZC' and turn off the down-bridge transistor 520. Further, the present invention uses the zero current comparator Comp2 to determine whether the zero current comparator Cmp1' and the adjustable delay unit 950 are too early or too late to turn off the down-bridge transistor 520, so as to adjust the delay time of the adjustable delay unit 950, and accurately control the turn off time of the down-bridge transistor 520, such that the efficiency of the power converter 60 is raised.

When the zero current comparator Cmp1' detects that current on the inductor 530 is decreased to zero, the zero current comparator Cmp1' outputs the zero current signal ZC', and the adjustable delay unit 950 delays and outputs the zero current signal ZC' according to the delay time, so as to turn off the down-bridge transistor 520 via the logic circuit 543. In other words, when a voltage of a positive input terminal of the zero current comparator Cmp1' is lower than a voltage of a negative input terminal thereof, the zero current comparator Cmp1' outputs a low-level zero current signal ZC', and the adjustable delay unit 950 delays and outputs the zero current signal ZC' according to the delay time, so as to turn off the down-bridge transistor 520 via the logic circuit 543. After the down-bridge transistor 520 is turned off, the zero current comparator Comp2 compares the voltage $V_{SW}$ of the node SW and the reference voltage $V_{ref}$, to determine whether the zero current comparator Cmp1' and the adjustable delay unit 950 are too early or too late to turn off the down-bridge transistor 520, and further output the comparison result $R_{comp}$ to adjust the delay time. Preferably, the delay time may be set as a specified time. When the voltage $V_{SW}$ of the node SW is smaller than the reference voltage $V_{ref}$, the zero current comparator Comp2 determines that the down-bridge transistor 520 is too late to be turned off, and outputs the low-level comparison result $R_{comp}$ to the counter 541. After the counter 541 receives the low-level comparison result $R_{comp}$, the counter 541 counts upward, leading the control bit Ctrl_bit to ascend. In such a situation, the adjustable delay unit 950 decreases the delay time according to the control bit Ctrl_bit. When the voltage $V_{SW}$ of the node SW is greater than the reference voltage $V_{ref}$, the zero current comparator Comp2 determines that the down-bridge transistor 520 is too early to be turned off, and outputs the high-level comparison result $R_{comp}$ to the counter 541. After the counter 541 receives the high-level comparison result $R_{comp}$, the counter 541 counts downward, leading the control bit Ctrl_bit to descend. In such a situation, the adjustable delay unit 950 increases the delay time according to the control bit Ctrl_bit. As a result, the zero current comparator Cmp1' and the adjustable delay unit 950 can precisely control cutoff time of the down-bridge transistor 520 when the current on the inductor 530 is decreased to zero, so as to enhance the efficiency of the power converter 60.

Note that, connecting directions of input terminals of the zero current comparator Comp1' and the zero current comparator Comp2 may be exchanged, which is not limited. For example, the positive input terminal of the zero current comparator Comp2 may be coupled to the reference voltage $V_{ref}$, and the negative input terminal of the zero current comparator Comp2 may be coupled to the node SW. In such a situation, when the zero current comparator Comp2 outputs the low-level comparison result $R_{comp}$ to the counter 541, the counter 541 counts downward according to the low-level comparison result $R_{comp}$, leading the control bit Ctrl_bit to descend. And, the adjustable delay unit 950 increases the delay time according to the control bit Ctrl_bit. When the zero current comparator Comp2 outputs the high-level comparison result $R_{comp}$ to the counter 541, the counter 541 counts upward according to the high-level comparison result $R_{comp}$, leading the control bit Ctrl_bit to ascend. And, the adjustable delay unit 950 decreases the delay time according to the control bit Ctrl_bit.

To sum up, the zero current detecting circuit of the present invention performs zero current detection and determines the moment of the down-bridge transistor being turned off through the first zero current comparator and the second zero current comparator, respectively. If the first zero current comparator, e.g. the zero current comparator Cmp1, determines the current on the inductor being zero, the first zero current comparator turns off the down-bridge transistor. At this moment, the second current comparator, e.g. the zero current comparator Cmp2, determines whether the down-bridge transistor turns off too early or too late and accordingly adjusts the voltage level of the first current comparator comparison through a counter and an adjustable voltage source to correctly detects the moment of the current on the inductor being zero and achieve controlling the moment that the down-bridge transistor being turned off accurately. Further, the efficiency of the power converter can be further improved. Alternatively, when a first zero current comparator (e.g. the zero current comparator Cmp1') determines that the current on the inductor is decreased to zero, the first zero current comparator and the delay unit turn off the down-bridge transistor. Meanwhile, the second zero current comparator (e.g. the zero current comparator Cmp2) determines whether the down-bridge transistor is too early or too late to be turned off, and timely adjusts the delay time via the counter and the delay unit, to precisely control the cutoff time of the down-bridge transistor, so as to enhance the efficiency of the power convertor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A zero current detecting circuit, comprising:
   a first zero current comparator for determining current variation on an inductor of a synchronous switching power converter so as to output a zero current signal to turn off a down-bridge transistor of the synchronous switching power converter;
   a second zero current comparator for determining whether the first zero current comparator turns off the down-bridge transistor too early or too late, and outputting a comparison result;
   a counter coupled to the second zero current comparator for ascending or descending a control bit according to the comparison result; and
   an adjustable delay unit coupled to the first zero current comparator and the counter for adjusting a delay time according to the control bit, and delaying and outputting the zero current signal according to the delay time, to compensate a negative offset voltage by delay.

2. The zero current detecting circuit of claim 1, wherein the counter ascends the control bit when the comparison result is at a low level and descends the control bit when the comparison result is at a high level.

3. The zero current detecting circuit of claim 1, wherein the adjustable voltage source increases the delay time when the control bit is decreased and decreases the delay time when the control bit is increased.

4. The zero current detecting circuit of claim 1, wherein the first zero current comparator comprises:
   a positive input terminal coupled to a first terminal of the down-bridge transistor for detecting current variation on the inductor;
   a negative input terminal coupled to the negative offset voltage; and
   an output terminal for outputting the zero current signal according to the current variation on the inductor and the negative offset voltage.

5. The zero current detecting circuit of claim 1, wherein the second zero current comparator comprises:
   a positive input terminal coupled to a first terminal of the down-bridge transistor for detecting current variation on the inductor;
   a negative input terminal coupled to a reference voltage; and
   an output terminal coupled to the counter for outputting the comparison result to the counter according to the reference voltage and the current variation on the inductor.

6. A synchronous switching power converter with zero current detecting, comprising:
   an up-bridge transistor comprising:
      a first terminal coupled to an input power supply;
      a second terminal; and
      a third terminal for receiving a turned-on signal;
   a down-bridge transistor comprising:
      a first terminal coupled to a ground;
      a second terminal coupled to the second terminal of the up-bridge transistor; and
      a third terminal for receiving a turned-off signal;
   an inductor coupled between the second terminal of the down-bridge transistor and an output capacitor; and
   a zero current detecting circuit comprising:
      a first zero current comparator for determining current variation on the inductor of a synchronous switching power converter so as to output a zero current signal to turn off a down-bridge transistor of the synchronous switching power converter;
      a second zero current comparator for determining whether the first zero current comparator turns off the down-bridge transistor too early or too late and outputting a comparison result;
      a counter coupled to the second zero current comparator for ascending or descending a control bit according to the comparison result; and
      an adjustable delay unit coupled to the first zero current comparator and the counter for adjusting an delay time according to the control bit, and delaying and outputting the zero current signal according to the delay time, to compensate a negative offset voltage by delay.

7. The synchronous switching power converter of claim 6, wherein the counter ascends the control bit when the comparison result is at a low level and descends the control bit when the comparison result is at a high level.

8. The synchronous switching power converter of claim 6, wherein the adjustable voltage source increases the delay time when the control bit is decreased and decreases the delay time when the control bit is increased.

9. The synchronous switching power converter of claim 6, wherein the first zero current comparator comprises:
a positive input terminal coupled to a first terminal of the down-bridge transistor for detecting the current variation on the inductor;
a negative input terminal coupled to the negative offset voltage; and
an output terminal for outputting the zero current signal according to the current variation on the inductor and the negative offset voltage to turn off the down-bridge transistor.

10. The synchronous switching power converter of claim 6, wherein the second zero current comparator comprises:
a positive input terminal coupled to a first terminal of the down-bridge transistor for detecting the current variation on the inductor;
a negative input terminal coupled to a reference voltage; and
an output terminal coupled to the counter for outputting the comparison result to the counter according to the reference voltage and the current variation on the inductor.

11. A zero current detecting method for a synchronous switching power converter, comprising:
determining current variation on an inductor of a synchronous switching power converter to output a zero current signal to turn off a down-bridge transistor of the synchronous switching power converter;
determining whether the down-bridge transistor is turned off too early or too late and outputting a comparison result;
ascending or descending a control bit according to the comparison result; and
adjusting a delay time according to the control bit, and delaying and outputting the zero current signal according to the delay time, to compensate a negative offset voltage by delay.

12. The zero current detecting method of claim 11, wherein ascending the control bit when the comparison result is at a low level and descending the control bit when the comparison result is at a high level.

13. The zero current detecting method of claim 11, further comprising increasing the delay time when the control bit is decreased and decreasing the delay time when the control bit is increased.

* * * * *